United States Patent
Yang

(10) Patent No.: US 11,718,563 B2
(45) Date of Patent: Aug. 8, 2023

(54) POLYMER CEMENT-GRANITE COMPOSITE TOMB BOX AND METHOD FOR MAKING SAME

(71) Applicant: Shanghai Yangyi Garden Group Co., Ltd., Shanghai (CN)

(72) Inventor: Guirong Yang, Shanghai (CN)

(73) Assignee: Shanghai Yangyi Garden Group Co., Ltd., Shanghai (CN)

(*) Notice: Subject to any disclaimer, the term of this patent is extended or adjusted under 35 U.S.C. 154(b) by 857 days.

(21) Appl. No.: 16/699,436

(22) Filed: Nov. 29, 2019

(65) Prior Publication Data

US 2020/0283339 A1    Sep. 10, 2020

(30) Foreign Application Priority Data

Mar. 5, 2019    (CN) .......................... 201910163678.4

(51) Int. Cl.

| | | |
|---|---|---|
| C04B 28/06 | (2006.01) | |
| C04B 14/06 | (2006.01) | |
| C04B 14/28 | (2006.01) | |
| C04B 24/26 | (2006.01) | |
| C04B 24/38 | (2006.01) | |
| C04B 41/00 | (2006.01) | |
| C04B 41/50 | (2006.01) | |
| C04B 41/65 | (2006.01) | |
| E04H 13/00 | (2006.01) | |
| B28B 1/14 | (2006.01) | |
| C04B 103/32 | (2006.01) | |
| C04B 103/50 | (2006.01) | |
| C04B 103/60 | (2006.01) | |
| C04B 111/54 | (2006.01) | |

(52) U.S. Cl.
CPC .............. *C04B 28/06* (2013.01); *C04B 14/06* (2013.01); *C04B 14/068* (2013.01); *C04B 14/28* (2013.01); *C04B 24/2641* (2013.01); *C04B 24/38* (2013.01); *C04B 24/383* (2013.01); *C04B 41/009* (2013.01); *C04B 41/50* (2013.01); *C04B 41/65* (2013.01); *E04H 13/00* (2013.01); *B28B 1/14* (2013.01); *C04B 2103/32* (2013.01); *C04B 2103/50* (2013.01); *C04B 2103/60* (2013.01); *C04B 2111/545* (2013.01)

(58) Field of Classification Search
CPC ......... E04H 13/00; C04B 41/65; C04B 41/50; C04B 41/009; C04B 28/06; C04B 24/383; C04B 24/38; C04B 24/2641; C04B 14/28; C04B 14/068; C04B 14/06
See application file for complete search history.

(56) References Cited

U.S. PATENT DOCUMENTS

2007/0101559 A1* 5/2007 Poteet .................... A61G 17/08
                                                                    27/6

FOREIGN PATENT DOCUMENTS

| CN | 101664357 A | 3/2010 | |
|---|---|---|---|
| CN | 104005593 B | 4/2016 | |
| CN | 106517963 A * | 3/2017 | ............. C04B 28/04 |
| CN | 206903355 U | 1/2018 | |
| EP | 2851053 A1 * | 3/2015 | ............. A61G 17/08 |

OTHER PUBLICATIONS

English machine translation of CN 106517936A. (Year: 2017).*
English machine translation of EP 2851053A1 (Year: 2015).*

* cited by examiner

*Primary Examiner* — John E Uselding

(57) ABSTRACT

Disclosed are a polymer cement-granite composite tomb box and a preparation method thereof. The tomb box has a layered structure or an upper-lower composite structure, where the layered structure is composed of one or two layers of granite slabs and one layer of the polymer cement, and an upper portion of the upper-lower composite structure is made of granite slabs, and an lower portion of the upper-lower composite structure is made of the polymer cement or a combination of the polymer cement and the granite slabs.

17 Claims, No Drawings

POLYMER CEMENT-GRANITE COMPOSITE TOMB BOX AND METHOD FOR MAKING SAME

CROSS-REFERENCE TO RELATED APPLICATIONS

This application claims the benefit of priority from Chinese Patent Application No. 201910163678.4, filed on Mar. 5, 2019. The content of the aforementioned application, including any intervening amendments thereto, is incorporated herein by reference in its entirety.

TECHNICAL FIELD

This application relates to a tomb box and a preparation method thereof, and more specifically to a polymer cement-granite composite tomb box and a method for making the same.

BACKGROUND OF THE INVENTION

Currently, there are mainly two types of tomb boxes used in the funeral industry for placing a casket, where one is an artificial stone tomb box made of cement, and the other is a stone box made of natural stone. The former has a simple, economical and resource-saving preparation process, but it fails to satisfy the desire for luxury and beauty any more due to the low bending strength, high brittleness, easy cracking, single color and unattractive appearance. Although the latter is beautiful and is deeply appreciated, it involves great difficulty in processing and high cost. Moreover, with the implementation of the national environmental policy, natural stone resources such as marble and granite have become increasingly scarce, and the existing reserves fail to meet the long-term demands. Therefore, how to reasonably use the limited natural stone resources to meet the growing requirement has been a problem to be solved for the funeral industry.

SUMMARY

An object of the application is to provide a polymer cement-granite composite tomb box and a method for making the same, where the tomb box has high bending strength, better impact resistance and low brittleness, and is not easy to crack.

The technical solutions of the invention are described as follows.

The invention provides a polymer cement-granite composite tomb box, comprising: a layered structure or an upper-lower composite structure, wherein the layered structure is formed by compounding one or two layers of granite slabs with one layer of polymer cement; an upper portion of the upper-lower composite structure is made of the granite slab, and a lower portion of the upper-lower composite structure is made of the polymer cement or a combination of the polymer cement and the granite slab.

In an embodiment, the granite slab is provided with a water-stop locking groove.

In an embodiment, the polymer cement consists of 20-35 parts by weight of a cement, 25-45 parts by weight of a fine aggregate, 25-55 parts by weight of a coarse aggregate, 0.01-0.5 part by weight of a superplasticizer, 1-6 parts by weight of a polymer, 0.001-0.005 part by weight of a retarder, 0.01-0.1 part by weight of an anti-cracking strengthening agent, 0.01-10 parts by weight of a stabilizer, 0.001-0.5 part by weight of an antifoaming agent and 0.5-1.2 parts by weight of a marble coating.

In an embodiment, the fine aggregate is quartz sand, river sand, crushed sand of limestone or dolomitic sand.

In an embodiment, the coarse aggregate is crushed limestone, dolomite or granite.

In an embodiment, the polymer is an ethylene-vinyl acetate copolymer, a vinyl chloride-vinyl laurate-ethylene terpolymer or a styrene-propylene copolymer.

In an embodiment, the superplasticizer is a polycarboxylate superplasticizer.

In an embodiment, the stabilizer is xanthan gum or cellulose ether.

The application further provides a method for preparing a polymer cement-granite composite tomb box comprising: assembling a granite slab in a mold, and mixing raw materials of the polymer cement in proportion in a blender to produce a polymer cement slurry having both viscosity and high fluidity; injecting the slurry into a cavity of the mold; allowing the slurry to solidify to have a certain strength; demoulding the solidified slurry; subjecting the demoulded product to wet curing and drying; and coating a surface of the polymer cement with a water-in-water granite coating to produce the tomb box, wherein the coating is consistent with the granite slab in color and pattern Advantages of the invention are described as follows.

The application has high bending strength and good impact resistance, and is less prone to breaking and cracking. In addition, the application also has simple preparation and good anti-seepage performance, and can greatly save natural stone resources.

DETAILED DESCRIPTION OF EMBODIMENTS

Preferred embodiments of the invention are provided below to clearly and completely illustrate the invention.

The invention provides a polymer cement-granite composite tomb box including a two- or three-layer composite structure which is accordingly composed of one layer or two layers of granite slabs and one layer of the polymer cement. Optionally, the tomb box may also include an upper-lower composite structure, of which an upper portion is completely made of granite slabs, and a lower portion is made of the polymer cement or a combination of the polymer cement and the granite slabs. When the tomb box has the two-layer composite structure, the inner layer is made of natural granite or other artificial marble materials and the outer layer is made of polymer cement. With regard to the three-layer structure, the inner layer and the outer layer are both made of granite slabs or other artificial marble slabs, and the middle layer is made of the polymer cement. When the upper-lower composite structure is applied, the upper layer is made of natural granite and the lower layer is made of the polymer cement or a combination of the polymer cement and the granite.

The granite slab is provided with a water-stop locking groove to ensure that respective parts of the composite structure of the tomb box are firmly bonded without water seepage.

The polymer cement consists of 20-35 parts by weight of a cement, 25-45 parts by weight of a fine aggregate, 25-55 parts by weight of a coarse aggregate, 0.01-0.5 part by weight of a superplasticizer, 1-6 parts by weight of a polymer, 0.001-0.005 part by weight of a retarder, 0.01-0.1 part by weight of an anti-cracking strengthening agent, 0.01-10 parts by weight of a stabilizer, 0.001-0.5 part by weight of an antifoaming agent and 0.5-1.2 parts by weight of a marble coating, and has lower cost.

The cement is selected from silicate cement, high-alumina cement, aluminoferriate cement, sulphoaluminate cement or other hydraulic cementitious materials.

The fine aggregate is quartz sand, river sand, crushed sand of limestone or dolomite sand.

The coarse aggregate is crushed limestone, dolomite or granite.

The polymer is selected from an ethylene-vinyl acetate copolymer, a vinyl chloride-vinyl laurate-ethylene terpolymer, a styrene-propylene copolymer, or other water-soluble polymers. The polymer is a dispersible powder or a liquid.

The superplasticizer is a polycarboxylate superplasticizer, or other superplasticizers compatible with the polymer.

The stabilizer is an organic compound such as xanthan gum and cellulose ether, or an ultrafine active mineral powder.

The antifoaming agent is an organic silicon antifoaming agent or a mineral oil antifoaming agent.

The marble coating is a decorative water-in-water granite coating which may be a pure acrylic resin or a pure acrylic silicone resin. The color and pattern of the coating are the same as that of the granite used herein.

The granite slab can be selected from natural marble, granite, artificial marble, ceramic tiles and other decorative plates, facilitating the selection of materials.

The invention further provides a method of preparing a polymer cement-granite tomb box, including:

assembling a granite slab in a mold; mixing raw materials of the polymer cement in proportion in a blender to produce a polymer cement slurry with viscosity and high fluidity; injecting the slurry into a cavity of the mold, where the slurry can be self-compacted without jolt ramming; allowing the slurry to solidify to have a certain strength; demoulding the solidified slurry; subjecting the demoulded product to wet curing and drying; and coating a surface of the polymer cement with a water-in-water granite coating as required to produce the tomb box; where the coating is consistent with the corresponding granite slab in color and pattern. The mold consists of an inner mold, an outer mold and a bottom mold, and is made of steel. The mold is required to have accurate size and smooth surface and to be free of deformation. After the components are assembled, the surface of the mold is brushed with saponified oil as a release agent.

The raw materials of the polymer cement are added to a blender in proportion and mixed thoroughly under stirring. During the mixing process, the addition amount of water is strictly controlled to enable the polymer cement slurry to possess suitable fluidity.

The formulated polymer cement slurry is slowly injected into the cavity of the mold and allowed to stand at room temperature for casting forming.

After the slurry is solidified to reach a certain strength, the product is demoulded and cured in a wet condition for 28 days to produce a tomb box, where the inner and outer surfaces of the tomb box are made of natural granite and the portion between the inner and outer surfaces is made of the polymer cement.

After mixed uniformly, the polymer cement slurry prepared in proportion, has good fluidity and stability, and is less prone to delamination and bleeding. After injected into the cavity of the mold, the slurry can be self-compacted without jolt ramming. The solidified polymer cement ensures the firm bonding between the inner and outer layers of granite due to its excellent bonding strength.

Example 1

A polymer cement-granite composite tomb box provided herein had a two-layer structure which is composed of one layer of granite slab and one layer of the polymer cement. For the two-layer structure, the inner layer was made of natural granite or other artificial marble and the outer layer was made of the polymer cement.

The polymer cement consisted of 26 parts by weight of a cement, 30 parts by weight of a fine aggregate, 40 parts by weight of a coarse aggregate, 0.25 part by weight of a superplasticizer, 3.25 parts by weight of a polymer, 0.005 part by weight of a retarder, 0.025 part by weight of an anti-cracking strengthening agent, 0.005 part by weight of a stabilizer, 0.24 part by weight of an antifoaming agent and 0.6 part by weight of a marble coating, which resulted in low cost.

Example 2

A polymer cement-granite composite tomb box provided herein had a t three-layer structure which is composed of two layers of granite slab and one layer of the polymer cement. For the three-layer structure, the inner layer and the outer layer were made of natural granite or other artificial marble and the middle layer was made of the polymer cement.

The polymer cement consisted of 35 parts by weight of a cement, 45 parts by weight of a fine aggregate, 25 parts by weight of a coarse aggregate, 0.01 part by weight of a superplasticizer, 1 part by weight of a polymer, 0.001 part by weight of a retarder, 0.1 part by weight of an anti-cracking strengthening agent, 10 parts by weight of a stabilizer, 0.5 part by weight of an antifoaming agent and 1.2 parts by weight of a marble coating, which resulted in low cost.

Example 3

A polymer cement-granite composite tomb box provided herein had an upper-lower composite structure, of which an upper layer was completely made of granite slabs, and a lower layer was made of the polymer cement or a combination of the polymer cement and the granite slabs.

The polymer cement consisted of 20 parts by weight of a cement, 25 parts by weight of a fine aggregate, 55 parts by weight of a coarse aggregate, 0.5 part by weight of a superplasticizer, 6 parts by weight of a polymer, 0.004 part by weight of a retarder, 0.01 part by weight of an anti-cracking strengthening agent, 0.01 part by weight of a stabilizer, 0.001 part by weight of an antifoaming agent and 0.5 part by weight of a marble coating, which resulted in low cost.

The composite tomb box of the invention not only has all the advantages of the natural granite tomb box such as high strength, beauty and good durability, but also has advantages of regular shape, accurate size and simple preparation, and thus it is suitable for the manufacturing of tomb boxes of any complicated shapes. Moreover, the composite tomb box also involves less consumption of stone resources. Compared to the conventional cement tomb box, the tomb box of the invention, due to the modification with the polymer, overcomes the defects of low bending strength, poor impact resistance, easy cracking and poor appearance, and has advantages of high strength, good toughness, high impact resistance, desirable dry shrinkage-resistance, no cracking and good durability.

The polymer cement of the invention is a novel organic-inorganic composite material, which employs a cement-based material as the substrate, an organic polymer as the strengthening agent, and a superplasticizer, an anti-cracking strengthening agent, a retarder, a stabilizer and an antifoaming agent as the auxiliary materials. In a slurry state, the polymer cement has good fluidity and stability, and is less prone to delamination, segregation and bleeding. After solidified, in addition to high compressive strength and bending strength, the polymer cement also has excellent bonding strength and proper flexibility to ensure the adhesion to the marble, even under impact.

The physical and mechanical performance of the artificial stone box of the polymer cement-granite composite tomb box of the invention meets the standards shown in Table 1.

TABLE 1

Test standards of physical and mechanical performance

| Item | First-grade product | Qualified product |
| --- | --- | --- |
| R28 compressive strength (Mpa) | no less than 35 | no less than 30 |
| R28 breaking strength (Mpa) | no less than 5.5 | no less than 5.0 |
| Anti-permeability | | No seepage after 24 hours of water storage |
| Impact resistance | | No deformation and damage after 10 times free fall impact of 15 kg sand bag from a height of 1 m |
| Fire resistance | | No structural damage after burned by the burning paper product for 0.5 h |

The embodiments described above are merely illustrative of the technical problems, technical solutions and beneficial effects of the invention, and are not intended to limit the invention. Various modifications, replacements, improvements and changes made without departing from the spirit of the invention should fall within the scope of the invention.

What is claimed is:

1. A polymer cement-granite composite tomb box, comprising: a layered structure;

wherein the layered structure is formed by compounding one layer of a granite slab or two layers of granite slabs and one layer of a polymer cement;

wherein the polymer cement consists of 20-35 parts by weight of a cement, 25-45 parts by weight of a fine aggregate, 25-55 parts by weight of a coarse aggregate, 0.01-0.5 part by weight of a superplasticizer, 1-6 parts by weight of a polymer, 0.001-0.005 part by weight of a retarder, 0.01-0.1 part by weight of an anti-cracking strengthening agent, 0.01-10 part by weight of a stabilizer, and 0.001-0.5 part by weight of an antifoaming agent and a surface of the polymer cement is coated with a marble coating.

2. The tomb box of claim 1, wherein the one layer of the granite slab or each of the two layers of granite slabs is provided with a water-stop locking groove.

3. The tomb box of claim 1, wherein the cement is silicate cement, high-alumina cement, aluminoferriate cement or sulfoaluminate cement.

4. The tomb box of claim 1, wherein the fine aggregate is quartz sand, river sand, crushed sand of limestone or dolomitic sand.

5. The tomb box of claim 1, wherein the coarse aggregate is crushed limestone, dolomite or granite.

6. The tomb box of claim 1, wherein the polymer is an ethylene-vinyl acetate copolymer, a vinyl chloride-vinyl laurate-ethylene terpolymer or a styrene-propylene copolymer.

7. The tomb box of claim 1, wherein the superplasticizer is a polycarboxylate superplasticizer.

8. The tomb box of claim 1, wherein the stabilizer is xanthan gum or cellulose ether.

9. A method for preparing the tomb box of claim 1, comprising:

assembling a granite slab in a mold, and mixing raw materials of the polymer cement in proportion in a blender to produce a polymer cement slurry having both viscosity and fluidity;

injecting the slurry into a cavity of the mold; allowing the slurry to solidify to have a certain strength and demoulding the solidified slurry; and subjecting the demoulded product to wet curing and drying and coating a surface of the polymer cement with a water-in-water granite coating to produce the tomb box; wherein the coating is consistent with the granite slab in color and pattern.

10. A polymer cement-granite composite tomb box, comprising: an upper-lower composite structure;

wherein an upper portion of the upper-lower composite structure is made of a granite slab; and a lower portion of the upper-lower composite structure is made of a polymer cement or a combination of a polymer cement and a granite slab;

wherein the polymer cement in the lower portion consists of 20-35 parts by weight of a cement, 25-45 parts by weight of a fine aggregate, 25-55 parts by weight of a coarse aggregate, 0.01-0.5 part by weight of a superplasticizer, 1-6 parts by weight of a polymer, 0.001-0.005 part by weight of a retarder, 0.01-0.1 part by weight of an anti-cracking strengthening agent, 0.01-10 part by weight of a stabilizer, and 0.001-0.5 part by weight of an antifoaming agent; and a surface of the polymer cement is coated with a marble coating.

11. The tomb box of claim 1, wherein the granite slab in the upper portion or the granite slab in the lower portion is provided with a water-stop locking groove.

12. The tomb box of claim 10, wherein the cement is silicate cement, high-alumina cement, aluminoferriate cement or sulfoaluminate cement.

13. The tomb box of claim 10, wherein the fine aggregate is quartz sand, river sand, crushed sand of limestone or dolomitic sand.

14. The tomb box of claim 10, wherein the coarse aggregate is crushed limestone, dolomite or granite.

15. The tomb box of claim 10, wherein the polymer is an ethylene-vinyl acetate copolymer, a vinyl chloride-vinyl laurate-ethylene terpolymer or a styrene-propylene copolymer.

16. The tomb box of claim 10, wherein the superplasticizer is a polycarboxylate superplasticizer.

17. The tomb box of claim 10, wherein the stabilizer is xanthan gum or cellulose ether.

* * * * *